April 20, 1926.
J. W. POLLOCK ET AL
LOCOMOTIVE CRANK AXLE
Filed Jan. 29, 1926
1,581,982
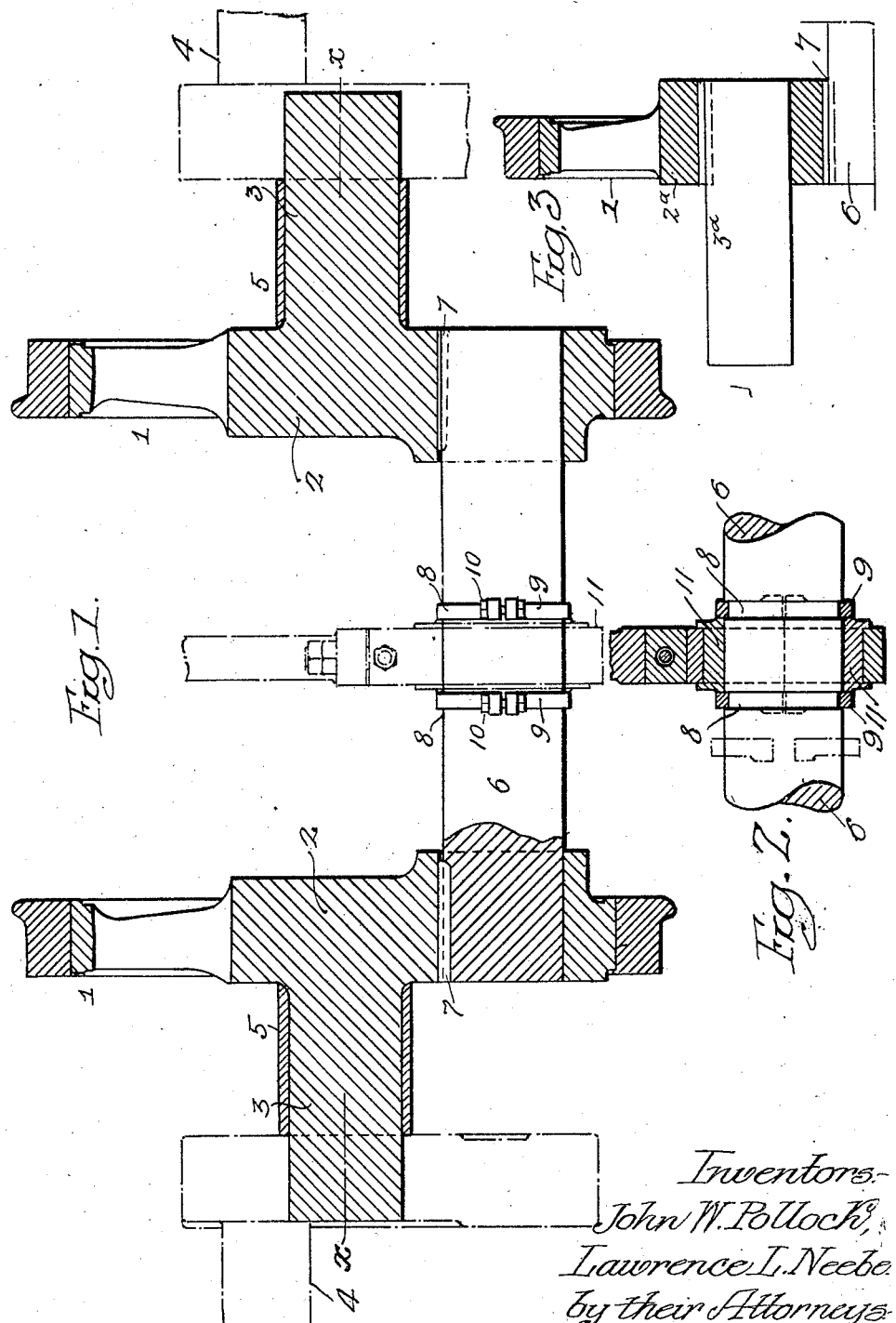
Inventors-
John W. Pollock,
Lawrence L. Neebe,
by their Attorneys
Howson & Howson Patented Apr. 20, 1926.

1,581,982

UNITED STATES PATENT OFFICE.

JOHN W. POLLOCK, OF RIDLEY PARK, PENNSYLVANIA, AND LAWRENCE L. NEEBE, OF WOODBURY, NEW JERSEY, ASSIGNORS TO THE BALDWIN LOCOMOTIVE WORKS, OF PHILADELPHIA, PENNSYLVANIA, A CORPORATION OF PENNSYLVANIA.

LOCOMOTIVE CRANK AXLE.

Application filed January 29, 1926. Serial No. 84,682.

*To all whom it may concern:*

Be it known that we, JOHN W. POLLOCK and LAWRENCE L. NEEBE, citizens of the United States, residing, respectively, in Ridley Park, Pennsylvania, and Woodbury, New Jersey, have invented Improvements in Locomotive Crank Axles, of which the following is a specification.

The object of our invention is to provide a crank-axle for a three-cylinder locomotive, wherein the driving-wheels, secured to said axle, are located inside the frame of the locomotive.

The invention is particularly adapted to narrow gauge locomotives, wherein the space between the wheels is insufficient to permit the use of the ordinary crank cheek-pieces.

In the accompanying drawing:

Fig. 1 is a sectional view through the crank and wheels of a locomotive, a portion of the crank-shaft being in full lines;

Fig. 2 is a longitudinal sectional view of the central connecting rod and the means of maintaining it in correct position on the crank; and Fig. 3 is a sectional view illustrating a modification of the invention.

1—1 constitute a pair of driving-wheels of a locomotive. These wheels are each formed with a cast metal center 2 and an integral axle extension 3, which projects through the journal box on the frame of the locomotive, and has at its outer end an outside crank 4, shown by dotted lines. 5 is a case-hardened steel bushing, driven onto the axle portion 3 as shown.

Extending between the pair of wheels 1—1 and to the rotational center line "x" of the wheels, is a crank-shaft 6, driven into an extension of the wheel center as shown, and secured therein by suitable keys 7. This construction leaves the entire space clear between the wheels.

The crank 6 has two annular grooves 8—8 spaced apart therein, and fitting these grooves are collars 9—9 held in place by bolts 10. These collars retain the central connecting rod journal 11 in position on the crank shaft 6, as shown by dotted lines in Fig. 1.

In some instances, in place of making the axle extension 3 integral with the wheel center as in Fig. 1, these extensions may be formed, as shown in Fig. 3, comprising separate sections 3ª, driven into the wheel center 2ª and keyed thereto.

The above elements are comparatively cheap to manufacture and assemble, and provide a substantial construction; and, furthermore, such construction provides sufficient clearance between the wheels, particularly of a narrow gauge locomotive, for the free movement of all parts, which would otherwise be restricted in a construction wherein the ordinary crank-axles with extended cheek-pieces are used.

This construction also affords free access to the rod journal brasses, so that they may be renewed without taking down the rod, the collars 9—9 being released from the grooves 8—8, as illustrated in broken lines in Fig. 2, for the purpose.

We claim:

1. The combination of two wheels spaced apart and having axle extensions on the outside only, said extensions being integral with the wheel centers; and a crank-shaft extending from one wheel to the other, said crank-shaft being located at one side of the central line through the wheels.

2. The combination of two wheels spaced apart and having axle sections on the outside only, said sections being integral with the wheel-centers; a crank-axle driven into openings in the wheel-centers, said axle being grooved; and collars mounted in the grooves and acting to center the middle main-rod journal mounted on the axle between the collars.

3. The combination of a pair of concentrically aligned wheels; a shaft extending between and secured to the said wheels, being disposed eccentrically of said center of alignment of said wheels, and forming a crank by which said wheels may be driven; a connecting rod rotatably mounted on said crank shaft; journal brasses in said rod; grooves in said crank-shaft adjacent the opposite sides of said connecting rod; and collars movably adapted to said grooves, whereby the brasses of said connecting rod may be renewed without taking down the said rod.

JOHN W. POLLOCK.
LAWRENCE L. NEEBE.